W. G. NEWTON.
VALVE FOR SEAT ACTION WATER CLOSETS.
APPLICATION FILED AUG. 31, 1914.
1,138,241.
Patented May 4, 1915.
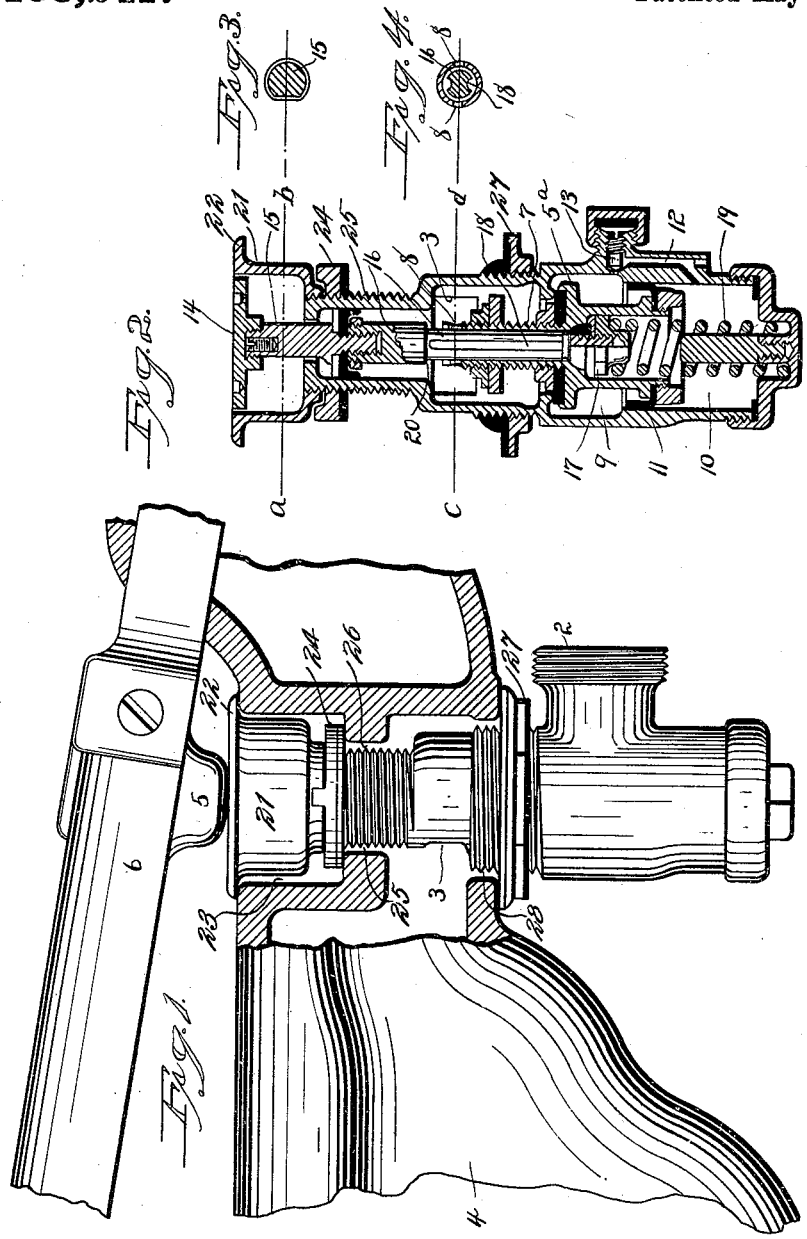

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

VALVE FOR SEAT-ACTION WATER-CLOSETS.

1,138,241. Specification of Letters Patent. Patented May 4, 1915.

Application filed August 31, 1914. Serial No. 859,409.

*To all whom it may concern:*

Be it known that I, WILLIAM G. NEWTON, a citizen of the United States, residing at New Haven, in the county of New Haven and State of Connecticut, have invented a new and useful Improvement in Valves for Seat-Action Water-Closets; and I do hereby declare the following, when taken in connection with the accompanying drawings and the characters of reference marked thereon, to be a full, clear, and exact description of the same, and which said drawings constitute part of this application, and represent, in—

Figure 1 a side view of a valve for seat-action water closets constructed in accordance with my invention and shown in connection with a water closet bowl provided with a hinged seat. Fig. 2 is a vertical section of my improved valve detached. Fig. 3 is a sectional view on line *a—b* of Fig. 2. Fig. 4 is a sectional view on line *c—d* of Fig. 3.

This invention relates to an improvement in valves for seat action water closets.

In many of the constructions of valves for seat action water closets the pressure of water is so great that the weight of a child is insufficient to open the valve so as to flush the closet.

The object of this invention is the construction of a valve provided with a vent by which the pressure of the water on the main valve will be released so that a slight pressure on the seat will be sufficient to operate the valve.

My improved valve has the usual inlet 2 and an outlet 3 into the bowl 4 to which the valve is attached to be operated by a lug 5 secured to the hinged cover 6. The passage between the inlet 2 and outlet 3 is closed by a main valve 5ª provided with a hollow stem 7 which in this case is formed near its upper end with openings 8. The inlet chamber 9 opens at the bottom into a compression chamber 10, the upper end of which is closed by a packing 11 at the lower end of the valve 5ª and the chambers 9 and 10 are connected by a by-pass 12 controlled by a screw plug 13. The operating head 14 in line with the lug 5 is connected with a vertically movable plunger 15 which is coupled with a valve stem 16 which extends down through the hollow valve stem 7 and carries a valve 17. The valve stem 16 is formed on opposite sides with grooves or channels 18. The valve 17 is forced upward by a spring 19 as well as by the pressure of water in the chamber 10.

The upper end of the valve casing has applied to it a cup 21 in which the operating head 14 is located, and this cup 21 has a flange 22 seated upon the edge of the cup-shaped recess 23 formed in the bowl 4. Provision for adjustment is made by providing a nut 24 screwed onto the threaded neck 25 of the casing and this nut rests on the bottom of the recess 23 in which there is an opening 26 for the upward passage of the valve casing. Below the outlet 3 the casing is also threaded for the reception of a nut 27 which has a bearing on the outside of the bowl around the clearance opening 28. The valve is thus suspended in the bowl.

In operation when the seat 6 is depressed the lug 5 bearing upon the head 14 forces the plunger 15 downward and thus moves the valve stem 16 so as to press the valve 17 away from its seat allowing the water in the compression chamber 10 to pass through the grooves 18 and openings 8 to the outlet 3. This removes the pressure in the chamber 10 so that the valve 5 may be moved downward by the engagement of a shoulder 20 on the stem 16 with the upper end of the valve stem 7. When the seat is released a spring 19 forces the valve 17 to its seat and the pressure of water closes the valve 5, this pressure also forcing the water through the by-pass 12 to the chamber 10, also tending to force the valve 5 to its seat. By providing the relief valve it is immaterial what pressure may be in the chamber 10 as the water pressure in the chamber is released by the first part of the downward movement of the operating mechanism.

I claim:—

The combination with a water closet bowl having a cup-shaped recess at the rear and clearance openings below said recess, of a valve comprising a valve casing having inlet and outlet openings, a main valve between the openings, said main valve formed with a hollow stem, a relief valve within the main valve, said relief valve having a stem formed on opposite sides with grooves, an operating head for moving the relief valve prior to the movement of the main valve, a cup adjustably connected with said valve casing and inclosing said head, said cup adapted to enter the recess in the bowl and formed with a flange adapted to rest upon the edge of the recess, and a nut on said casing below the bowl adapted to be turned into engagement therewith.

In testimony whereof, I have signed this specification in the presence of two subscribing witnesses.

WILLIAM G. NEWTON.

Witnesses:
R. W. HOADLEY,
C. M. VAN SLYKE.

Copies of this patent may be obtained for five cents each, by addressing the "Commissioner of Patents, Washington, D. C."